Aug. 28, 1962 W. J. BEVINGTON 3,051,200
PIPE PLUG
Filed April 4, 1960 2 Sheets-Sheet 1
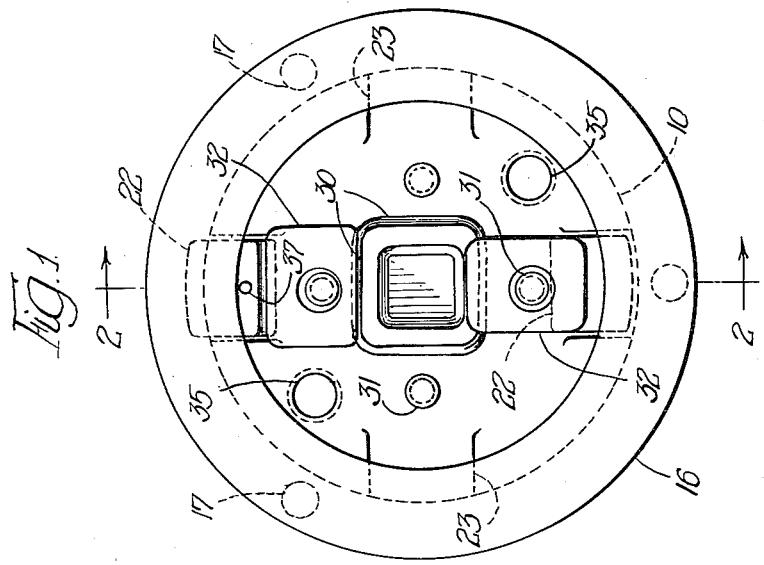
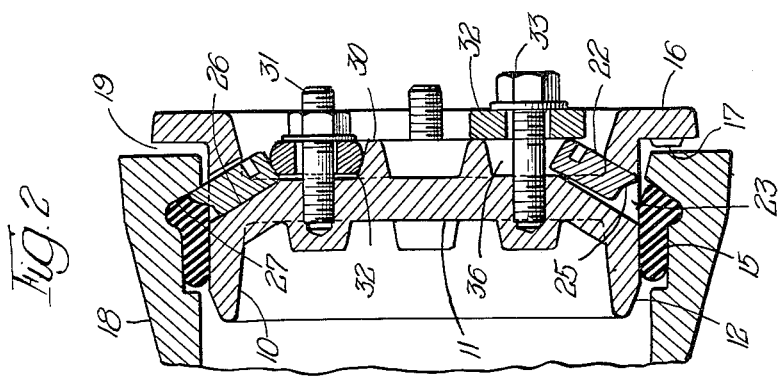
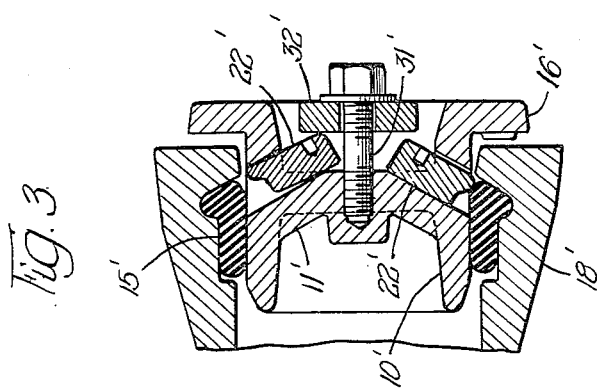

Aug. 28, 1962 W. J. BEVINGTON 3,051,200
PIPE PLUG
Filed April 4, 1960 2 Sheets-Sheet 2
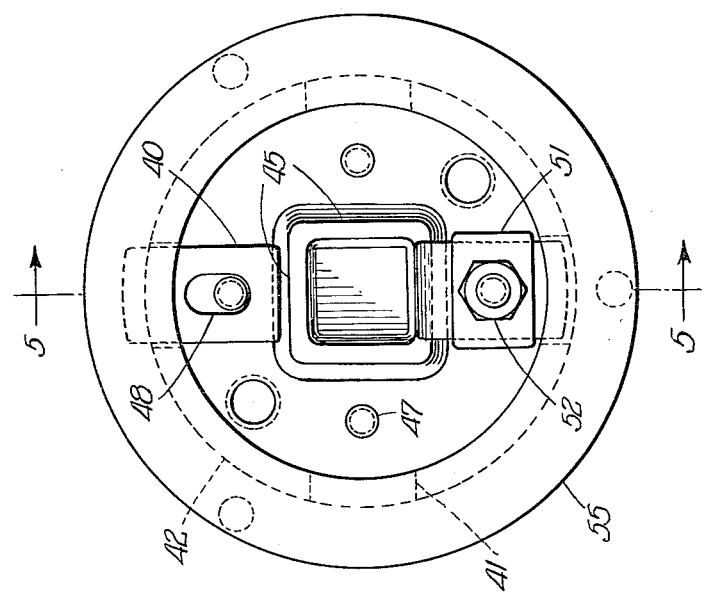
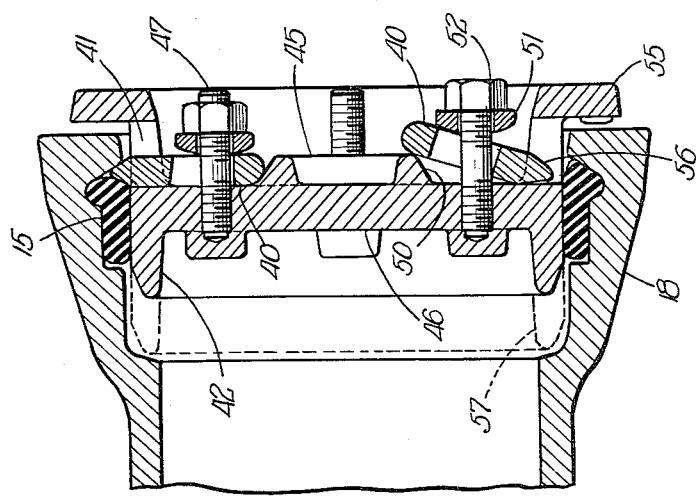

United States Patent Office 3,051,200
Patented Aug. 28, 1962

3,051,200
PIPE PLUG
William J. Bevington, Coshocton, Ohio, assignor to James B. Clow & Sons, Inc., Coshocton, Ohio, a corporation of Delaware
Filed Apr. 4, 1960, Ser. No. 19,789
3 Claims. (Cl. 138—89)

This invention relates to pipes that have an enlarged "bell" end in which a thick rubber sealing ring is mounted for engaging the small "spigot" end of another pipe. The sealing ring or gasket projects from an annular recess in the bell and is compressed radially as the pipe spigot is forced, wedge-like, therethrough.

Friction is reduced by lubricating the pipe spigot and the joint is constrained from separating by external means. In a trench, the constraining means is rather automatically provided as the pipes are overlaid with soil; and this fact, coupled with recent improvements in the gasket, has made these push type or "push-tight" pipes very popular for underground water mains.

The bottom of a trench does not provide a very good working condition, however. The pipe bell is apt to be fouled by dirt and it is advisable to check tightness after a number of the pipes have been installed. For this purpose, the piping contractor must somehow close the end of the pipe line and subject the joints to internal fluid pressure.

The pipes are generally laid with the bell end ahead and the simplest closing device is therefore a plug but an ordinary bell plug has to be blocked in some way, to keep it from being blown out, and no very cheap or fast way is commonly available.

A simple expeditious closing means has now been provided in the form of a pipe plug that can be securely locked in push-tight pipe bells and readily removed therefrom. Nitches for the locking bars are obtained by wedging the gasket away from the axially outer edge of its recess—as can be seen from the accompanying drawings, in which:

FIGURE 1 is an end elevational view of a plug that embodies a preferred form of the invention;

FIGURE 2 is a side sectional view taken along the line 2—2 of FIGURE 1;

FIGURE 3 is a side-sectional view of a similar plug that is especially adapted to small pipes;

FIGURE 4 is an end elevational view of a plug that embodies an alternative form of the invention; and FIGURE 5 is a side sectional view taken along the line 5—5 of FIGURE 4.

It will be noted from FIGURES 1 and 2 that the body of the plug comprises an annular wall or spigot 10 and a center wall 11 extending radially across the spigot, adapted for use with a bell and gasket, for example, as shown in Kurtz Patent No. 2,898,131, dated August 4, 1959. The nominally inner end 12 of the spigot is tapered for plowing through a gasket, such as that numbered 15, and the opposite end of the spigot has a flange 16 projecting therefrom for limiting the distance that the plug can be inserted in a bell. Stops 17 project axially inwardly from the flange and cooperate with the bell 18 in defining a gap 19 for the accommodation of a parting bar.

Latches 22 extend radially outwardly into a circumferential series of openings 23 in the spigot and have sliding engagement with the nominally outer side of the center wall 11. The outer end of each latch is provided with a nose 25 which is directed at the axially outer end of the gasket 15 (in FIGURE 2). The axially inner face of the latches and path 26 is, preferably, parallel to the inner face 27 of the bell lip which may define an angle of from 55 to 85 degrees with the axis of the bell.

A ridge 30 projects from the center wall in spaced relationship with the inner end of each latch and a screw or post 31 is mounted on the center wall intermediate each ridge and latch. A wedge-bar 32 is loosely mounted on each post 31 and supported axially outwardly by a nut 33. Tapped holes 35 serve to attach auxiliary piping for the passage of fluids through the plug, if and when desired.

Viewed in FIGURE 1, the wedge-bars 32 have a rectangular shape and are oriented two ways. In the top half of the figure, the wedge-bar engages the inner end of a latch 22 and the opposed face of a ridge 30; the nose 25 of the latch projects outwardly from the spigot 10 and the short sides of the wedge-bar are vertical. In the bottom half of the figure, the wedge-bar engages a latch 22 and a ridge 30 in an axially abutting manner; the latch is retracted from the periphery of the spigot and the short sides of the wedge-bar are horizontal.

Viewed in FIGURE 2, the inner ends of the latches and the outer sides of the ridges define a gap 36 that flares axially outwardly. Related to a plane passed normally through the axis of the plug, the latch side of the gap is inclined about 60 degrees; the ridge side, about 75 degrees. These angles are not critical, however, and may be varied several degrees either way. The long side faces of the wedge-bars are rounded for entering the gap 36 and may possibly diverge axially outwardly.

The plug is readied for service by arranging the members as shown in the bottom half of FIGURE 2 and tightening the nuts 33, an action that clamps the latches between the center wall 11 and the wedge-bars 32. Placement in a pipe bell is accomplished by means of apparatus commonly used to couple push-tight pipe and well described in manufacturer's literature.

The bosses 17 are brought into close contact with the face of the bell but may recoil slightly therefrom due to the resiliency of the gasket. It is desirable therefore that the nose 25 of the latches have a well-rounded end and be pushed a little past the location that puts the axially outer face of the latches in alignment with the internal bell face 27.

The plug is secured by loosening the nuts 33, turning the wedge-bars some 90 degrees on the posts 31, shifting the latches outwardly until they touch the gasket, and tightening the nuts. Being freely mounted on the posts 31, the wedge-bars slide along the sloping outer sides of the ridges 30 and are crowded radially outwardly somewhat as the nuts are tightened. The inner ends of the latches engage the radially outer sides of the bars in a similar sliding manner and are forced toward the gasket.

It will be noted that the wedge-bars are supported on both sides of the gap 36 and thus restrained from tilting. When properly placed in the bell, the noses 25 of the latches are rammed between the outer end of the gasket and the adjacent surface 27. The distance that the latches are driven bell-ward varies with the thickness of the latches and the angle included by the radially opposed faces of the latches and ridges.

The plug is removed by reversing the steps taken to embed the latches in the bell, placing a pinch bar in the gap 19, and prying axially outwardly on the flange 16. Alternatively, the plug may be unlatched and then blown from the bell by fluid pressure. Holes 37 permit the latches to be manipulated, when loosened, by a small rod.

In adapting the construction to small pipes, those having a nominal diameter of five inches or less, the ridges 30 are eliminated. As shown in FIGURE 3, a single post 31' is coaxially mounted on the center wall 11' of small plugs. Two latches 22' are employed, in diametrically opposed relationship, and secured by a single wedge-bar 32' mounted on the single post. Excepting size, the members differ little from those shown in FIGURE 2 and have been given similar reference numbers.

The variation shown in FIGURES 4 and 5 is characterized by having latches 40 mounted like the wedge-bars 32 (FIGURE 2). Extending radially inwardly from openings 41 in the spigot 42, the latches 40 engage ridges 45 projecting from the nominally outer side of the center wall 46. Posts 47 pass through slots 48 in the latches and firmly engage the center wall midway between the openings 41 and ridges 45.

When fully retracted, the latches extend well over the top of the ridges and slant from the center wall at an angle preferably between 10 and 25 degrees. Within this range of inclination, the latches are readily secured to the axially inwardly elements 45, 46 by means of round-nosed washers 51 and nuts 52 mounted on the posts 47.

When pushed into a pipe bell 18 as far as the flange 55 permits, the noses 56 of the latches are located somewhat axially inwardly from the outer end of the gasket 15 and can be shifted somewhat radially outwardly after the nuts 52 are loosened. The rounded inner ends of the latches are put in sliding engagement with the sloping outer sides 50 of the ridges, by such action, and are crowded radially outwardly when the nuts are retightened.

The nosed ends 56 of the latches are pressed into the gasket recess from a less favorable angle than the noses 25, previously considered, and are best lubricated slightly. Taking friction into consideration (friction between the latches and the four adjacent elements 15, 45, 46 and 51), the inclination of the ridge sides 50 is best held in the range of 40 to 60 degrees.

The flange 55 is more convenient than essential and can be eliminated at some saving in cost. In this case the spigot is made long enough to seat in the pipe bell as shown by the dashed outline 57 in FIGURE 5.

With this and other minor modifications in mind, I claim:

1. In combination: a pipe bell having a thick rubber sealing ring mounted therein, groove and ridge means cooperating between said bell and said rubber sealing ring for preventing axial translation of rubber sealing ring relative to said bell; a plug within said pipe bell comprising a cylindrical wall having an outside diameter larger than the inside diameter of said sealing ring, said cylindrical wall extending axially inwardly for compressing the sealing ring radially, a center wall extending radially across said cylindrical wall, a plurality of latches that project radially outwardly somewhat beyond said cylindrical wall and have sliding relationship with the nominally outer side of said center wall, a threaded post projecting from said center wall in radial alignment with each said latch, and a rectangular bar pivotally mounted on each said post for the dual purpose of wedging each said latch radially outwardly in a first pivoted position and for clamping said latch in a retracted position when desired in a second pivoted position, means on said threaded posts for forcing each said latch against the outer end of the sealing ring and engaging the pipe bell axially outwardly when in service.

2. The construction described in claim 1 further characterized by said cylindrical wall having a flange mounted on the nominally outer end thereof for limiting the distance that the plug can be pushed in a pipe bell.

3. The construction described in claim 1 further characterized by the axially inner face of said latches defining an angle of from 55 to 85 degrees with the axis of the plug.

References Cited in the file of this patent
UNITED STATES PATENTS

| | | |
|---|---|---|
| 737,667 | Schunck | Sept. 1, 1903 |
| 847,265 | Super | Mar. 12, 1907 |
| 1,876,947 | Jahn et al. | Sept. 13, 1932 |
| 2,233,223 | Patterson | Feb. 25, 1941 |
| 2,855,003 | Thaxton | Oct. 7, 1958 |